(No Model.)
G. GRILL.
CIRCULAR SAW GUARD.
No. 261,090. Patented July 11, 1882.
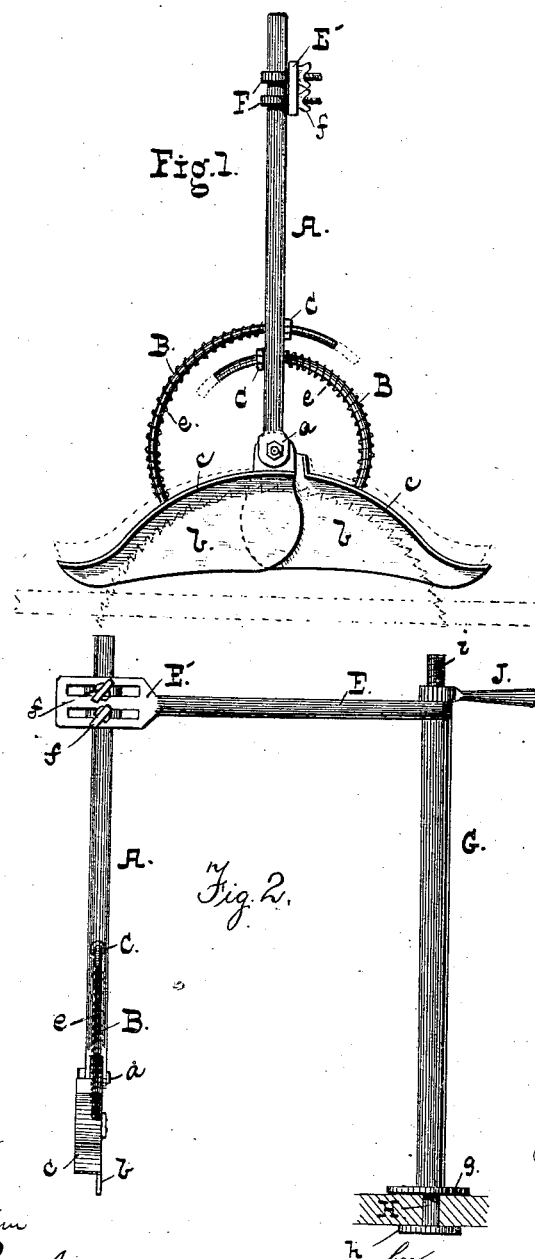

UNITED STATES PATENT OFFICE.

GOTTFRIED GRILL, OF BALTIMORE, MARYLAND.

CIRCULAR-SAW GUARD.

SPECIFICATION forming part of Letters Patent No. 261,090, dated July 11, 1882.

Application filed March 22, 1882. (No model.)

*To all whom it may concern:*

Be it known that I, GOTTFRIED GRILL, of Baltimore city, State of Maryland, have invented certain new and useful Improvements in Circular-Saw Guards; and I hereby declare the same to be fully, clearly, and exactly described as follows, reference being had to the accompanying drawings, in which—

Figure 1 is a side elevation, and Fig. 2 an end elevation, of the device.

The object of my invention is to provide a circular-saw guard designed to prevent injury to the operator, and to shield the teeth of the saw above the table without concealing them, and adapted to yield, so as to admit of its use without the necessity for adjustment in sawing various thicknesses of lumber.

In the drawings, A is a standard, to which is pivoted at $a$ a pair of plates, $b\ b$, having top flanges, $c$, as shown. From each plate extends a rod, B, curved in the arc of a circle described about the pivot $a$, and passing through the standard, between which and the plates $b$ springs $e$ are coiled. The ends of the rods B are threaded, and on them are mounted nuts C. It will be seen that the springs $e$ hold the plates normally in positions determined by the nuts C and permit of the outer ends of the plates being tilted upward.

G is a tubular standard, terminating below in a flange, $g$, and through it passes a rod, H, having a flange, $h$, and threaded end $i$. On the latter is mounted a nut having a handle, J, adapted to clamp the horizontal arm E on the top of the standard G, and at the same operation to clamp the latter upon the table, as will be understood. The arm E terminates in a plate, E', having slots through which pass screw-rods having on their ends rings that embrace the standard A. Nuts $f$ serve to clamp the standard to the plate E'.

In operation the standard G is mounted at the side of the saw at the proper distance therefrom to bring the plates $b$ nearly in contact with the saw and the flanges $c$ directly over it. The standard A is then adjusted up or down, so as to bring the flanges $c$ close to the saw-teeth, but sufficiently raised to prevent the teeth from striking them.

The lower edges of the plates $b$ may be high enough above the table to clear the lumber; but if not, the plates simply tilt upward and the board slides under them.

One side of the device being open, the saw is visible, and the adjustment is readily effected without danger of causing the teeth to strike the flanges $c$.

The whole concern being attached to the table, lifts with it away from the saw when it is desired to remove the latter or alter the height of its bearings.

Should it be desired to remove the device in order to saw a board so wide as not to pass between the saw and standard G, the clamp-nut J is simply run up off the end $i$, the rod H drops down under the table, and the guard is lifted away.

Having thus described my invention, what I claim as new, and desire to secure by Letters Patent, is—

1. In combination with the plate $c$, mounted above the saw and pivoted to an arm or support, the rod B, attached to the plate, passing through the support and having nut C, and spring $e$, as described.

2. In combination with the saw-guard and supporting-arms, the tubular standard G, the rod H passing therethrough and having a flange, $h$, and threaded end $i$, the jam-nut or clamp J, and arm E, whereby the latter and the standard are secured at one operation.

GOTTFRIED GRILL.

Witnesses:
R. D. WILLIAMS,
W. A. BERTRAM.